United States Patent [19]
Baum et al.

[11] Patent Number: 5,291,639
[45] Date of Patent: Mar. 8, 1994

[54] PUSH BUTTON

[75] Inventors: Heinz-Otto Baum, Giessen-Allendorf; Lothar Schliessner, Linden, both of Fed. Rep. of Germany

[73] Assignee: Emhart Inc., Newark, Del.

[21] Appl. No.: 41,799

[22] Filed: Apr. 1, 1993

[30] Foreign Application Priority Data

Apr. 14, 1992 [DE] Fed. Rep. of Germany ....... 9205186

[51] Int. Cl.$^5$ ................... F16B 21/00; A44B 17/00
[52] U.S. Cl. ............................ 24/297; 24/289; 24/453; 411/437; 411/182
[58] Field of Search ................ 24/297, 453, 563, 289; 411/437, 182, 512, 339, 508, 510

[56] References Cited

U.S. PATENT DOCUMENTS

| | | | |
|---|---|---|---|
| 4,782,562 | 11/1988 | Yuta | 24/297 |
| 4,828,444 | 5/1989 | Oshida | 411/437 |
| 4,890,966 | 1/1990 | Umeizawa | 24/297 |
| 4,999,019 | 3/1991 | Kraus | 411/437 |

*Primary Examiner*—Victor N. Sakran
*Attorney, Agent, or Firm*—Edward D. Murphy

[57] ABSTRACT

A plastics push button for fastening an article such as trim strip or body panel to a motor body using weld studs attached to the surface of the motor body comprises a large circular retaining head at one end of a short, hollow cylindrical stem and a circular skirt at or near the other end of the stem, the diameter of the skirt being substantially equal to the diameter of mounting holes provided around a panel or at intervals along the length of a trim strip and the diameter of the head being greater than that of mounting holes, the skirt being provided with a plurality of protruding, resilient fringe members which can lightly engage the rim of a mounting hole and the bore of the cylindrical stem being provided with resilient fingers which can engage the projections of a weld stud when the push button is pressed through a mounting hole so that the cylindrical head abuts the top surface of the article and the cylindrical stem passes through the mounting hole and is pressed over the weld stud so that the article is thereby retained on the surface of the sheet to which the stud is welded. For some applications, such as the application of body panels, the skirt may be provided at the end of the stem remote from the retaining head but for other applications the skirt may be provided on the stem a short distance from that end.

8 Claims, 2 Drawing Sheets

PUSH BUTTON

BACKGROUND OF THE INVENTION

The present invention relates to a push button for pressing on to a stud, particularly a weld stud, usually in order to secure some article to the receptor surface to which the stud is welded.

Weld studs have long been known for attachment to sheet metal structures such, for example, as motor vehicle bodies and may be formed with circumferential ridges, often in the form of a thread, to which fastening elements can be attached.

The fastening element may take the form of a nut or a push button which can be pushed on to the weld stud so that an article may be retained between the fastening element and the surface to which the weld stud is attached.

German specification DE 28 02 465 discloses a plastic push button designed as a flange nut with a smooth bore provided with three radial slots. The flexibility of the plastics material allows the push button to distort when pressed onto the stud so that it engages the stud firmly.

German specification DE 27 44 294 discloses a plastic anchoring element for trim strips and the like, which comprises an elongated basic body adapted to clip the trim strip thereon and an opening into which extend a number of resilient fingers directed at an angle. When the opening of the element is pressed over a stud welded to a car body, the fingers lock behind the head of the T-stud to secure the element in the stud where it can be used to mount the trim strip.

It is an object of the present invention to provide a fastener which is particularly suitable for mounting trim strips and body panels on a motor vehicle body by means of weld studs such as the kind provided with peripheral ridges running around the stud like a thread. Such weld studs are commonly known as "Christmas tree studs" and are disclosed in German gebrauchsmuster specification G7925469.

BRIEF DESCRIPTION OF THE INVENTION

According to the present invention, a plastics push button for fastening an article such as trim strip or body panel to a motor body using weld studs attached to the surface of the motor body comprises a large circular retaining head at one end of a short, hollow cylindrical stem and a circular skirt at or near the other end of the stem, the diameter of the skirt being substantially equal to the diameter of mounting holes provided around a panel or at intervals along the length of a trim strip and the diameter of the head being greater than that of mounting holes, the skirt being provided with a plurality of protruding, resilient fringe members which can lightly engage the rim of a mounting hole and the bore of the cylindrical stem being provided with resilient fingers which can engage the projections of a weld stud when the push button is pressed through a mounting hole so that the cylindrical head abuts the top surface of the article and the cylindrical stem passes through the mounting hole and is pressed over the weld stud so that the article is thereby retained on the surface of the sheet to which the stud is welded.

For some applications such as the application of body panels, the skirt may be provided at the end of the stem remote from the retaining head but for other applications the skirt may be provided on the stem a short distance from that end.

The resilient fingers provided in the bore of the stem to engage the ridges of the weld stud act in known fashion and may be located in two or more groups in different regions of the bore as is well known for fasteners applied to weld studs.

The diameter of the circular retaining head must be at least equal to and preferably greater than the outer periphery of the skirt including the projecting fringe members. The protruding fringe members preferably have circumferential recesses which facilitate engagement with the rim of the mounting hole.

The push button according to the invention can thus first be assembled on a trim strip or body panel where it is safely retained until the trim strip or body panel is attached to a car body by means of weld studs, simply by presenting the joint assembly and trim strip or panel with push buttons already in position to the receiving weld studs attached to the car body. When the push buttons are located in register with the respective weld studs, they are simply pressed home and the trim strip or panel secured thereby. A simple and reliable system of attaching trim strips and panels to car bodies is thereby provided by using the push button according to the invention.

BRIEF DESCRIPTION OF THE DRAWINGS

In order that the invention be better understood, a preferred embodiment will now be described in greater detail by way of example with reference to the accompanying drawings in which.

DETAILED DESCRIPTION OF EMBODIMENT AND DRAWINGS

Figure 1:
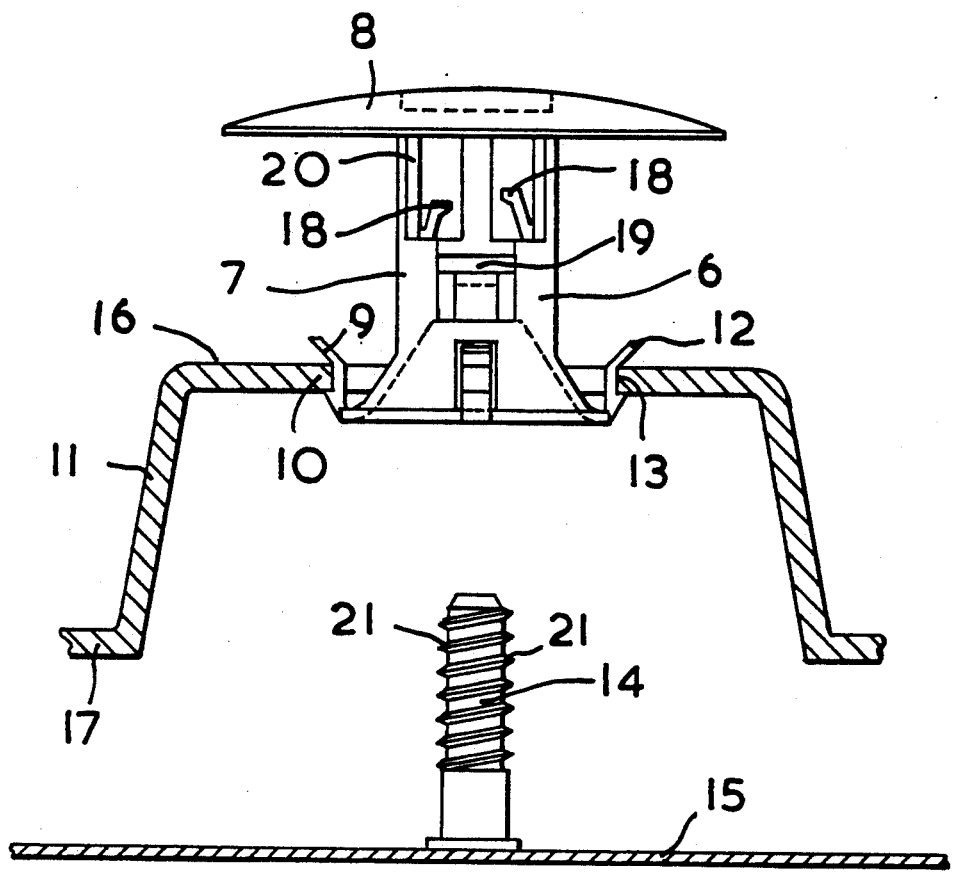
FIG. 1 is a schematic section of a plastics push button assembled on a U-channel trim strip to be attached to a car body.
Figure 2:
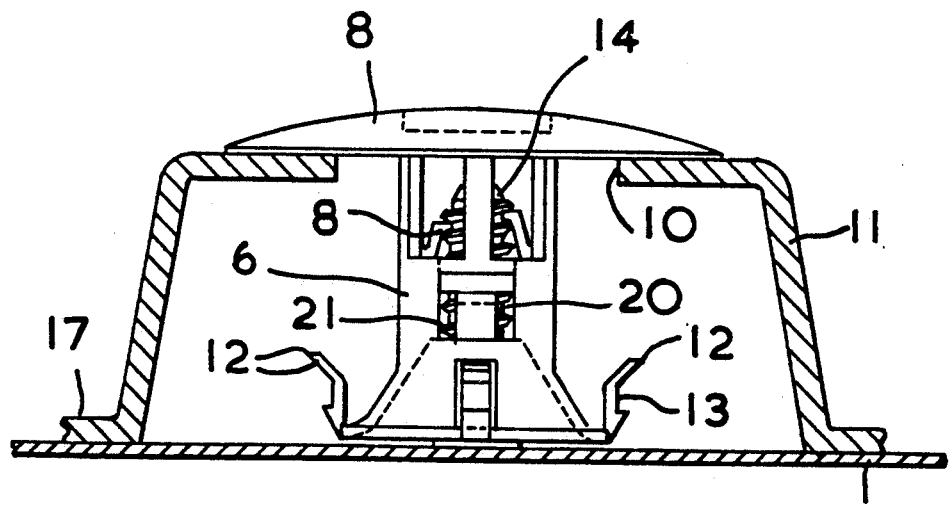
FIG. 2 is a schematic section of the push button of FIG. 1 after attachment of the trim strip to a car body.
Figure 3:
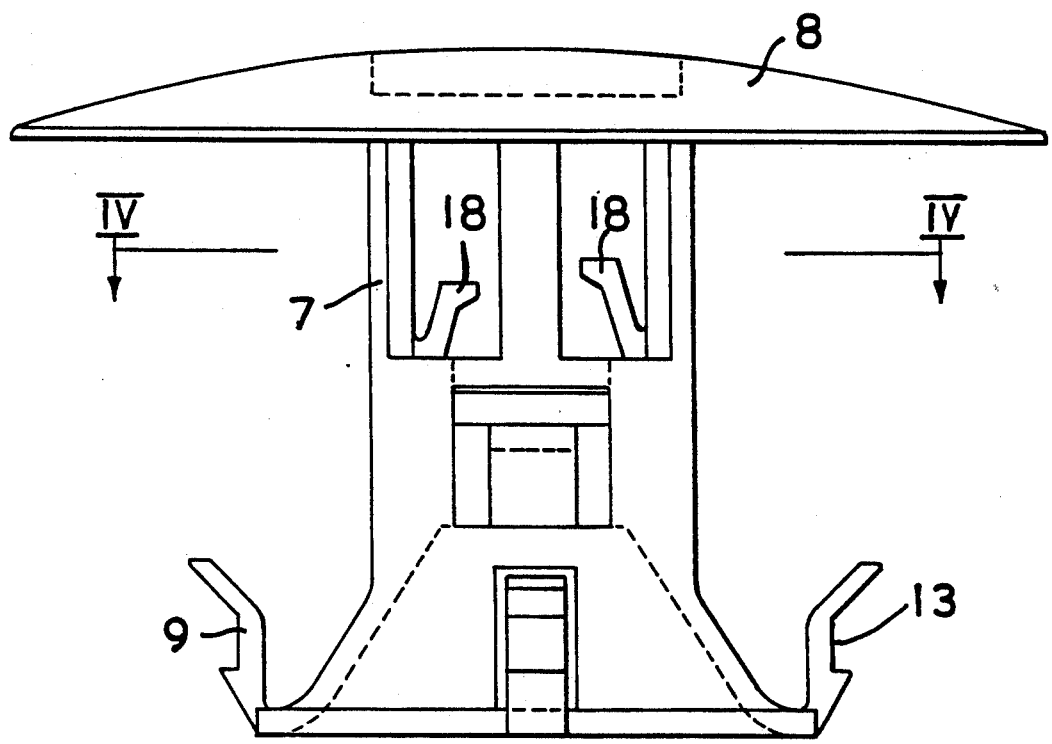
FIG. 3 is a section on a larger scale of the push button of FIGS. 1 and 2.
Figure 4:
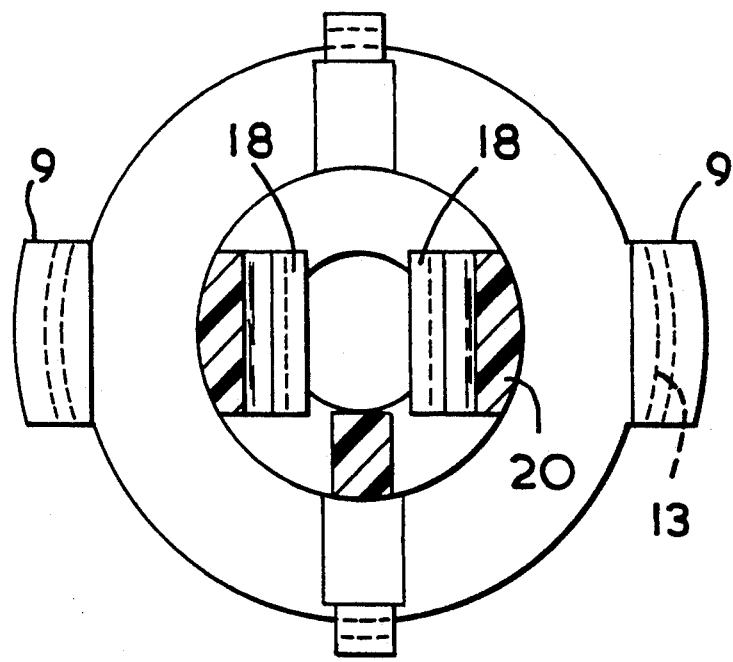
FIG. 4 is a part section on line IV—IV of FIG. 3.

The push-button 6 consists of a short, cylindrical stem 7 having a large circular, slightly domed head 8 at one end and a circular skirt 9 at the other end. The diameter of skirt 9 is equal to that of mounting holes 10 provided at intervals in U-channel trim strip 11 but resilient fringe members 12 project from the skirt so that recesses 13 in the fringe members 12 can engage the rim of a hole 10 when the skirt 9 is lightly pressed into hole 10.

The combined assembly of trim strip 11 and push button 6 is presented to a Christmas tree stud 14 welded to panel 15 of a motor car body.

A pair of resilient retaining fingers 18, project into bore 20 of stem 7 and further resilient retaining fingers (not shown but located in region 19), also project into bore 20. Firm pressure on push button 6 disengages fringe members 12 so that stem 7 is pressed over stud 14 and passes through hole 10 until the head 8 of the push button 6 abuts upper surface 16 of trim strip 11 and the lower edge 17 of trim strip 11 is retained against panel 15. The two sets of retaining fingers are deflected so that they engage ridges 21 of the Christmas tree stud 14 when the hollow stem 7 is pressed down over stud 14 as far as possible.

Using the push button according to the invention, a trim strip can be prepared as a pre-assembly combination, with push buttons partly inserted into each mounting hole of the strip so that they are retained by the resilient members 12. The pre-assembled combination can then be presented to a car body with the push-buttons in register with the studs which have been welded to the car body and each stud fully pressed home so that the retaining heads 8 engage the upper surface 16 of the trim strip 11 and the lower edges 17 of the trim strip 11 is thereby held firmly against panel 15.

We claim:

1. A plastics push button for fastening an article such as a trim strip or body panel to a motor body using weld studs attached to the surface of the motor body comprising a large circular retaining head at one end of a short hollow cylindrical stem, and a circular skirt at or near, the other end of the stem, the diameter of the skirt being substantially equal to the diameter of mounting holes provided around a panel or at intervals along the length of a trim strip and the diameter of the head being greater than that of the mounting holes, the skirt being provided with a plurality of protruding resilient fringe members which can lightly engage the rim of a mounting hole and the bore of the cylindrical stem being provided with resilient fingers which can engage the projections of a weld stud when the push button is pressed through a mounting hole so that the cylindrical head abuts the top surface of the article and the cylindrical stem passes through the mounting hole and is pressed over the weld stud so that the article is thereby retained on the surface of the surface to which the stud is welded.

2. A push button according to claim 1, wherein the diameter of the circular retaining head is equal to the outer periphery of the skirt including the projecting fringe members.

3. A push button according to claim 1, wherein the diameter of the circular retaining head is greater than the outer periphery of the skirt including the projecting fringe members.

4. A push button according to any one of the preceding claims wherein the skirt is provided at the end of the stem remote from the retaining head.

5. A push button according to any one of claims 1, 2 or 3, wherein the skirt is provided on the stem a short distance from the end remote from the retaining head.

6. A push button according to any one of claims 1, 2 or 3, having two resilient retaining fingers.

7. A push button according to any one of claims 1, 2 or 3, having four resilient retaining fingers.

8. A push button according to any one of claims 1, 2 or 3, wherein each protruding fringe member has a circumferential recess which facilitates engagement with the rim of the mounting hole.

* * * * *